US010474671B2

(12) United States Patent
Behzadi et al.

(10) Patent No.: US 10,474,671 B2
(45) Date of Patent: Nov. 12, 2019

(54) INTERPRETING USER QUERIES BASED ON NEARBY LOCATIONS

(71) Applicant: Google LLC, Mountain View, CA (US)

(72) Inventors: Behshad Behzadi, Zurich (CH); Nils Grimsmo, Adliswil (CH)

(73) Assignee: Google LLC, Mountain View, CA (US)

(*) Notice: Subject to any disclaimer, the term of this patent is extended or adjusted under 35 U.S.C. 154(b) by 609 days.

(21) Appl. No.: 14/707,669

(22) Filed: May 8, 2015

(65) Prior Publication Data

US 2015/0324425 A1   Nov. 12, 2015

Related U.S. Application Data

(60) Provisional application No. 61/991,967, filed on May 12, 2014.

(51) Int. Cl.
*G06F 16/2457* (2019.01)
*G06F 16/245* (2019.01)
*H04L 29/12* (2006.01)
*G06F 16/9537* (2019.01)
*G06F 16/9535* (2019.01)

(52) U.S. Cl.
CPC ........ *G06F 16/245* (2019.01); *G06F 16/9537* (2019.01); *H04L 61/609* (2013.01); *G06F 16/24575* (2019.01); *G06F 16/9535* (2019.01)

(58) Field of Classification Search
CPC ......... G06F 17/30528; G06F 17/30867; G06F 16/24564; G06F 16/9537; G06F 16/2425; G06F 16/9535
See application file for complete search history.

(56) References Cited

U.S. PATENT DOCUMENTS 7,373,246 B2 * 5/2008 O'Clair .............. G06F 17/3087
 701/426
7,523,099 B1   4/2009 Egnor et al.
(Continued)

FOREIGN PATENT DOCUMENTS

CA   2725542   12/2009
CN   102591911   7/2012
(Continued)

OTHER PUBLICATIONS

Lu et al., "Personalize Web Search Results with User's Location", 2010, SIGIR.*
(Continued)

*Primary Examiner* — Apu M Mofiz
*Assistant Examiner* — Sheryl L Holland
(74) *Attorney, Agent, or Firm* — Fish & Richardson P.C.

(57) ABSTRACT

Methods, systems, and apparatus, including computer programs encoded on a computer storage medium, for receiving a query provided from a user device, and determining that the query is implicitly about some entity, and in response: obtaining an approximate location of the user device when the user device provided the query, obtaining a set of entities including one or more entities, each entity in the set of entities being associated with the approximate location, and determining that the query is implicitly about an entity in the set of entities, and in response: providing a revised query based on the query and the entity, the revised query explicitly referencing the entity.

7 Claims, 5 Drawing Sheets

(56) References Cited

U.S. PATENT DOCUMENTS

| | | | |
|---|---|---|---|
| 7,743,056 B2* | 6/2010 | Meisels | G06F 17/30241 |
| | | | 707/731 |
| 7,774,003 B1 | 8/2010 | Ortega | |
| 8,200,247 B1 | 6/2012 | Starenky et al. | |
| 8,239,130 B1 | 8/2012 | Upstill | |
| 8,396,888 B2 | 3/2013 | Cheng et al. | |
| 8,437,778 B1 | 5/2013 | Ortega et al. | |
| 8,478,519 B2 | 7/2013 | Agarwal et al. | |
| 8,560,539 B1* | 10/2013 | Engebretsen | G06F 17/3071 |
| | | | 707/736 |
| 8,560,561 B2 | 10/2013 | Govani et al. | |
| 8,566,030 B1 | 10/2013 | Demiryurek et al. | |
| 8,660,541 B1* | 2/2014 | Beresniewicz | H04W 4/02 |
| | | | 455/404.2 |
| 8,688,727 B1* | 4/2014 | Das | G06F 17/30528 |
| | | | 707/748 |
| 9,111,011 B2 | 8/2015 | Kogan et al. | |
| 9,194,716 B1 | 11/2015 | Cutter | |
| 9,430,858 B1* | 8/2016 | Har | G01C 21/32 |
| 9,582,515 B1* | 2/2017 | Doubleday | G06F 17/30241 |
| 9,626,454 B1 | 4/2017 | Kogan et al. | |
| 9,753,946 B2* | 9/2017 | Dan | G06F 17/30241 |
| 2002/0188615 A1* | 12/2002 | Latarche | G06F 17/30321 |
| 2005/0027694 A1 | 2/2005 | Sauermann | |
| 2007/0106509 A1* | 5/2007 | Acero | G06F 17/30746 |
| | | | 704/240 |
| 2007/0174299 A1 | 7/2007 | Kuang et al. | |
| 2008/0097966 A1 | 4/2008 | Choi et al. | |
| 2008/0154876 A1 | 6/2008 | Hao | |
| 2008/0243821 A1* | 10/2008 | Delli Santi | G06F 17/3087 |
| 2009/0005968 A1 | 1/2009 | Vengroff et al. | |
| 2009/0248626 A1 | 10/2009 | Miller | |
| 2009/0265340 A1 | 10/2009 | Barcklay et al. | |
| 2010/0031186 A1 | 2/2010 | Tseng et al. | |
| 2010/0205172 A1* | 8/2010 | Luk | G06F 17/30616 |
| | | | 707/715 |
| 2010/0211566 A1* | 8/2010 | Ghanekar | G06F 17/3087 |
| | | | 707/724 |
| 2010/0293173 A1 | 11/2010 | Chaping | |
| 2010/0318551 A1 | 12/2010 | Lai | |
| 2011/0013569 A1* | 1/2011 | Scherzer | H04W 48/14 |
| | | | 370/329 |
| 2011/0131500 A1* | 6/2011 | Ohazama | G06F 17/3087 |
| | | | 715/738 |
| 2011/0167077 A1 | 7/2011 | Govani et al. | |
| 2011/0238690 A1 | 9/2011 | Arrasvuori et al. | |
| 2011/0313657 A1 | 12/2011 | Myllymaki et al. | |
| 2012/0047147 A1 | 2/2012 | Redstone et al. | |
| 2012/0059713 A1* | 3/2012 | Galas | G06Q 30/0244 |
| | | | 705/14.49 |
| 2012/0072287 A1* | 3/2012 | Crane | G06Q 30/0261 |
| | | | 705/14.58 |
| 2012/0143859 A1 | 6/2012 | Lymperopoulous et al. | |
| 2012/0259829 A1* | 10/2012 | Zhou | G06F 17/30448 |
| | | | 707/706 |
| 2012/0265528 A1 | 10/2012 | Gruber et al. | |
| 2012/0265787 A1* | 10/2012 | Hsu | G06F 17/3064 |
| | | | 707/780 |
| 2013/0007654 A1 | 1/2013 | Tseng et al. | |
| 2013/0031089 A1 | 1/2013 | Allen et al. | |
| 2013/0110519 A1* | 5/2013 | Cheyer | G06F 17/3087 |
| | | | 704/275 |
| 2013/0144899 A1* | 6/2013 | Lee | G06F 17/30392 |
| | | | 707/759 |
| 2013/0311506 A1 | 11/2013 | Taubman et al. | |
| 2013/0326425 A1 | 12/2013 | Forstall et al. | |
| 2014/0018094 A1 | 1/2014 | Oren | |
| 2014/0025706 A1 | 1/2014 | Barve et al. | |
| 2014/0040274 A1 | 2/2014 | Aravamudan et al. | |
| 2014/0059030 A1* | 2/2014 | Hakkani-Tur | G06F 17/30663 |
| | | | 707/706 |
| 2014/0067860 A1* | 3/2014 | Govindachetty | G06F 17/30241 |
| | | | 707/771 |
| 2014/0082062 A1* | 3/2014 | Bellver | G06F 17/3087 |
| | | | 709/203 |
| 2014/0095303 A1* | 4/2014 | Jones | G06F 17/30867 |
| | | | 705/14.49 |
| 2014/0101600 A1 | 4/2014 | Macbeth et al. | |
| 2014/0207748 A1* | 7/2014 | Sood | G06F 17/3097 |
| | | | 707/706 |
| 2014/0330818 A1* | 11/2014 | Raina | G06Q 30/02 |
| | | | 707/723 |
| 2015/0332670 A1 | 11/2015 | Akbacak | |
| 2016/0055218 A1 | 2/2016 | Grimsmo et al. | |
| 2017/0277702 A1 | 9/2017 | Grimsmo et al. | |

FOREIGN PATENT DOCUMENTS

| | | |
|---|---|---|
| CN | 103688260 | 2/2017 |
| WO | WO2013101490 A1 | 7/2013 |

OTHER PUBLICATIONS

Extended European Search Report issued in European Application No. 15167265.6 dated Sep. 18, 2015, 6 pages.

International Search Report and Written Opinion in International Application No. PCT/US2015/029696, dated Jul. 14, 2015, 10 pages.

International Preliminary Report on Patentability, issued in International Application No. PCT/US2015/045538, dated Feb. 21, 2017, 7 pages.

International Search Report and Written Opinion in International Application No. PCT/US2015/045538, dated Nov. 20, 2015, 11 pages.

International Preliminary Report on Patentability in International Application No. PCT/US2015/045539, dated Mar. 2, 2017, 7 pages.

International Search Report and Written Opinion in International Application No. PCT/US2015/045539, dated Nov. 18, 2015, 11 pages.

CN Office Action in Chinese Application No. 201510237884.7, dated Jul. 2, 2019, 21 pages (with English translation).

* cited by examiner

INTERPRETING USER QUERIES BASED ON NEARBY LOCATIONS

CROSS-REFERENCE TO RELATED APPLICATIONS

This application claims priority to U.S. Prov. App. No. 61/991,967, filed May 12, 2014, the disclosure of which is expressly incorporated herein by reference in the entirety.

BACKGROUND

The Internet provides access to a wide variety of resources, such as image files, audio files, video files, and web pages. A search system can identify resources in response to queries submitted by users and provide information about the resources in a manner that is useful to the users. The users can navigate through, e.g., select, search results to acquire information of interest.

SUMMARY

This specification relates to interpreting user queries based on a location of a user device.

Implementations of the present disclosure are generally directed to rewriting queries based on one or more implied entities. More particularly, implementations of the present disclosure are directed to identifying a set of entities based on an approximate location of a user device that submits a query, and rewriting the query to explicitly reference an entity of the set of entities, which the query is determined to implicitly reference.

In general, innovative aspects of the subject matter described in this specification can be embodied in methods that include actions of receiving a query provided from a user device, and determining that the query is implicitly about some entity, and in response: obtaining an approximate location of the user device when the user device provided the query, obtaining a set of entities including one or more entities, each entity in the set of entities being associated with the approximate location, and determining that the query is implicitly about an entity in the set of entities, and in response: providing a revised query based on the query and the entity, the revised query explicitly referencing the entity. Other implementations of this aspect include corresponding systems, apparatus, and computer programs, configured to perform the actions of the methods, encoded on computer storage devices.

These and other implementations can each optionally include one or more of the following features: determining that the query is implicitly about the entity includes: providing a sub-set of entities based on comparing one or more types of one or more entities of the set of entities to one or more types associated with the query, the entity being included in the sub-set of entities, and selecting the entity from the sub-set of entities; if a type of a respective entity in the set of entities corresponds to a type associated with the query, the respective entity is included in the sub-set of entities; the one or more types associated with the query are provided from an index that associates types to respective n-grams of queries; actions further include determining that the sub-set of entities includes a plurality of entities, and in response, selecting the entity from the sub-set of entities; actions further include comparing one or more attributes of respective entities in the sub-set of entities, the entity being selected based on respective one or more attributes; if a location of a respective entity is within a threshold distance of the approximate location, the respective location is included in the set of entities; and receiving a set of entities and determining that the query is implicitly about an entity in the set of entities are performed in response to determining that the approximate location is sufficiently fresh.

Particular implementations of the subject matter described in this specification can be implemented so as to realize one or more of the following advantages. In some examples, the user submitting the query does not need to know the name of the entity that is the subject of the query. For example, the user can be standing near a monument and can submit the query [what is this monument], without having to first determine the name of the monument. In some examples, the user does not need to know how to properly pronounce and/or spell the name of the entity. For example, a user that does not speak German can be on vacation in Zurich, Switzerland and can submit the query [opening hours], while standing near a restaurant called "Zeughauskeller," which may be difficult to pronounce and/or spell for the user. As another example, implementations of the present disclosure enable users to more conveniently and naturally interact with a search system (e.g., submitting the query [show me lunch specials] instead of the query [Fino Ristorante & Bar lunch specials]. These examples highlight simplification of information retrieval and increased information accessibility to users that are provided by implementations of the present disclosure. For example, users do not have to first submit queries to determine the name of an entity, before submitting queries to retrieve other information about the entity. This also provides the advantage of reducing the overall number of queries that might be submitted to a search system, thereby reducing the bandwidth, computational power, and/or memory required by the search system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Implementations of the present disclosure are generally directed to rewriting queries based on one or more implied entities. More particularly, implementations of the present disclosure are directed to determining one or more entities that a received query is implicitly about, selecting an entity of the one or more entities, and rewriting the query to explicitly reference the selected entity. In some implementations, a set of entities is identified based on an approximate location of a user device that submits a query, each entity in the set of entities being determined to be sufficiently close to the approximate location. In some implementations, and as described in further detail herein, for each entity in the set of entities, it is determined whether the query may be implicitly referencing the entity. In some examples, for each entity, it is determined whether one or more n-grams of the query correlate to a type of the entity, and, if a correlation is provided, the query is deemed to be potentially about the respective entity, and the entity is added to a sub-set of entities. In some examples, an entity is selected from the sub-set of entities, and the query is rewritten to explicitly reference the selected entity. In some examples, search results are provided based on the revised query.

Figure 1:
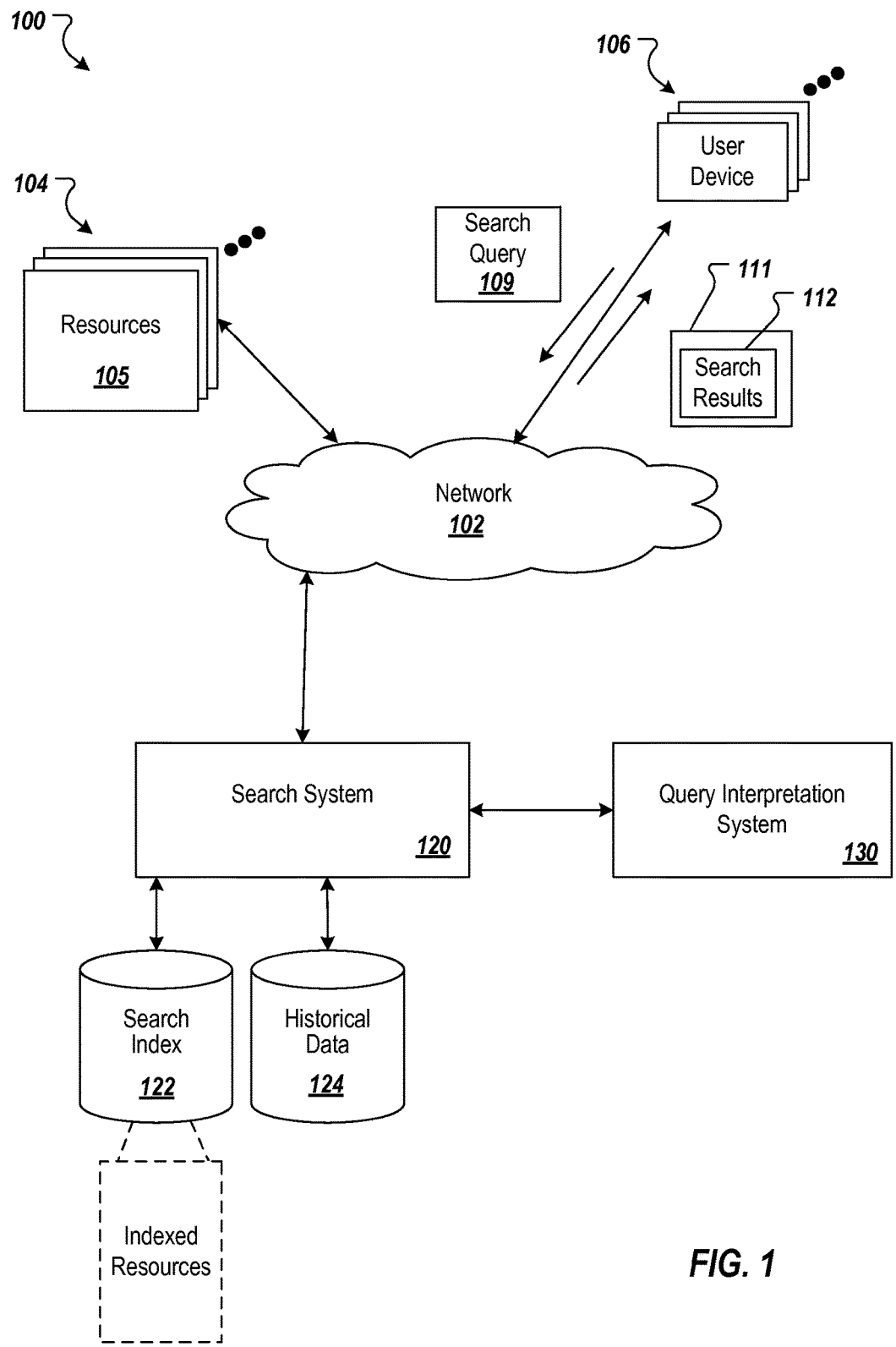
FIG. 1 depicts an example environment in which a search system provides search results based on interpreted user queries.

FIG. 1 depicts an example environment 100 in which a search system provides search results based on interpreted user queries. In some examples, the example environment 100 enables users to interact with one or more computer-implemented services. Example computer-implemented services can include a search service, an electronic mail service, a chat service, a document sharing service, a calendar sharing service, a photo sharing service, a video sharing service, blogging service, a micro-blogging service, a social networking service, a location (location-aware) service, a check-in service and a ratings and review service. In the example of FIG. 1, a search system 120 is depicted, which provides a search service, as described in further detail herein.

With continued reference to FIG. 1, the example environment 100 includes a network 102, e.g., a local area network (LAN), wide area network (WAN), the Internet, or a combination thereof, connects web sites 104, user devices 106, and the search system 120. In some examples, the network 102 can be accessed over a wired and/or a wireless communications link. For example, mobile computing devices, such as smartphones can utilize a cellular network to access the network 102. The environment 100 may include millions of web sites 104 and user devices 106.

In some examples, a web site 104 is provided as one or more resources 105 associated with a domain name and hosted by one or more servers. An example web site is a collection of web pages formatted in an appropriate machine-readable language, e.g., hypertext markup language (HTML), that can contain text, images, multimedia content, and programming elements, e.g., scripts. Each web site 104 is maintained by a publisher, e.g., an entity that manages and/or owns the web site.

In some examples, a resource 105 is data provided over the network 102 and that is associated with a resource address, e.g., a uniform resource locator (URL). In some examples, resources 105 that can be provided by a web site 104 include web pages, word processing documents, and portable document format (PDF) documents, images, video, and feed sources, among other appropriate digital content. The resources 105 can include content, e.g., words, phrases, images and sounds and may include embedded information, e.g., meta information and hyperlinks, and/or embedded instructions, e.g., scripts.

In some examples, a user device 106 is an electronic device that is capable of requesting and receiving resources 105 over the network 102. Example user devices 106 include personal computers, laptop computers, and mobile computing devices, e.g., smartphones and/or tablet computing devices, that can send and receive data over the network 102. As used throughout this document, the term mobile computing device ("mobile device") refers to a user device that is configured to communicate over a mobile communications network. A smartphone, e.g., a phone that is enabled to communicate over the Internet, is an example of a mobile device. A user device 106 can execute a user application, e.g., a web browser, to facilitate the sending and receiving of data over the network 102.

In some examples, to facilitate searching of resources 105, the search system 120 identifies the resources 105 by crawling and indexing the resources 105 provided on web sites 104. Data about the resources 105 can be indexed based on the resource to which the data corresponds. The indexed and, optionally, cached copies of the resources 105 are stored in a search index 122.

The user devices 106 submit search queries 109 to the search system 120. In some examples, a user device 106 can include one or more input modalities. Example modalities can include a keyboard, a touchscreen and/or a microphone. For example, a user can use a keyboard and/or touchscreen to type in a search query. As another example, a user can speak a search query, the user speech being captured through a microphone, and being processed through speech recognition to provide the search query.

In response to receiving a search query 109, the search system 120 accesses the search index 122 to identify resources 105 that are relevant to, e.g., have at least a minimum specified relevance score for, the search query 109. The search system 120 identifies the resources 105, generates a search results display 111 that includes search results 112 identifying resources 105, and returns the search results display 111 to the user devices 106. In an example context, a search results display can include one or more web pages, e.g., one or more search results pages. In some examples, a web page can be provided based on a web document that can be written in any appropriate machine-readable language. It is contemplated, however, that implementations of the present disclosure can include other appropriate display types. For example, the search results can be provided in a display generated by an application that is executed on a computing device, and/or a display generated by an operating system, e.g., mobile operating system. In some examples, search results can be provided based on any appropriate form, e.g., Javascript-html, plaintext.

A search result 112 is data generated by the search system 120 that identifies a resource 105 that is responsive to a particular search query, and includes a link to the resource 105. An example search result 112 can include a web page title, a snippet of text or a portion of an image extracted from the web page, and the URL of the web page. In some examples, data provided in the search results 112 can be retrieved from a resource data store. For example, the search system 120 can provide the search results display 111, which displays the search results 112. In some examples, the search results display 111 can be populated with information, e.g., a web page title, a snippet of text or a portion of an image extracted from the web page, that is provided from the resource data store.

In some examples, data for the search queries 109 submitted during user sessions are stored in a data store, such as the historical data store 124. For example, the search system 120 can store received search queries in the historical data store 124.

In some examples, selection data specifying actions taken in response to search results 112 provided in response to each search query 109 are also stored in the historical data store 124, for example, by the search system 120. These actions can include whether a search result 112 was selected, e.g., clicked or hovered over with a pointer. The selection data can also include, for each selection of a search result 112, data identifying the search query 109 for which the search result 112 was provided.

In accordance with implementations of the present disclosure, the example environment 100 also includes a query interpretation system 130 communicably coupled to the search system 120, e.g., directly coupled or coupled over a network such as network 102. Although the search system 120 and the query interpretation system 120 are depicted as separate systems in FIG. 1, it is contemplated that the search system 120 can include the query interpretation system 130. In some implementations, the query interpretation system 130 provides a revised query based on a query received from a user device 106. In some examples, and as described in further detail herein, the revised query is provided based on an approximate location of the user device 106 that provided the query, and one or more entities that are determined to be proximate to the user device 106. In some examples, the search results 112 provided by the search system 120 are responsive to the revised query.

In some implementations, a plurality of entities and information associated therewith can be stored as structured data in a knowledge graph. In some examples, a knowledge graph includes a plurality of nodes and edges between nodes. In some examples, a node represents an entity and an edge represents a relationship between entities. In some examples, the knowledge graph can be provided based on an example schema that structures data based on domains, types and properties. In some examples, a domain includes one or more types that share a namespace. In some examples, a namespace is provided as a directory of uniquely named objects, where each object in the namespace has a unique name, e.g., identifier. In some examples, a type denotes an "is a" relationship about a topic, and is used to hold a collection of properties. In some examples, a topic represents an entity, such as a person, place or thing. In some examples, each topic can have one or more types associated therewith. In some examples, a property is associated with a topic and defines a "has a" relationship between the topic and a value of the property. In some examples, the value of the property can include another topic.

In some implementations, a plurality of entities can be provided in one or more databases. For example, a plurality of entities can be provided in a table that can provide data associated with each entity. Example data can include a name of the entity, a location of the entity, one or more types, described in further detail below, assigned to the entity, one or more ratings associated with the entity, and any other appropriate information that can be provided for the entity.

Implementations of the present disclosure are generally directed to rewriting queries based on one or more implied entities. More particularly, implementations of the present disclosure are directed to identifying a set of entities based on an approximate location of a user device that submits a query, and rewriting the query to explicitly reference an entity of the set of entities, which the query is determined to implicitly reference.

Figure 2A:
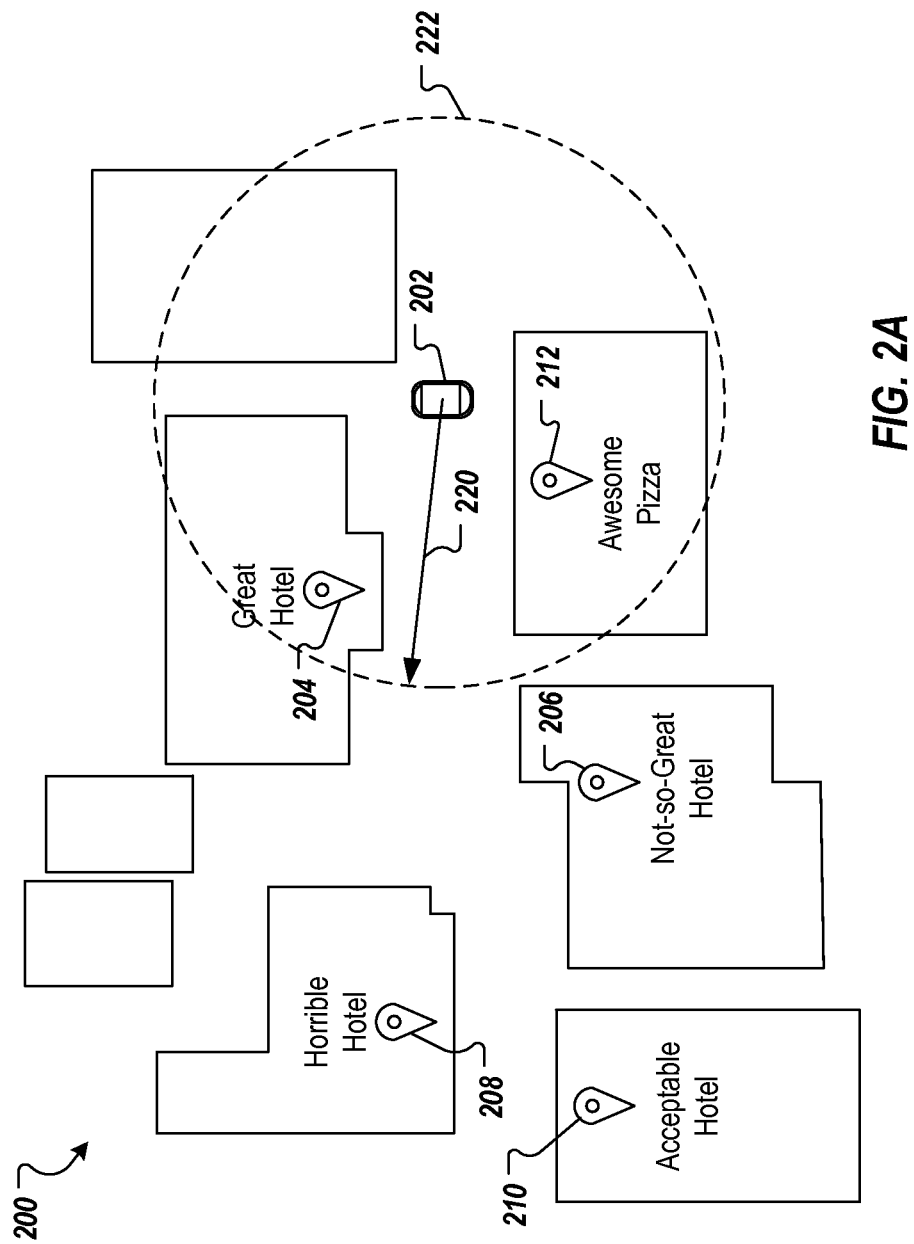
FIGS. 2A and 2B depict example use cases in accordance with implementations of the present disclosure.
Figure 2B:
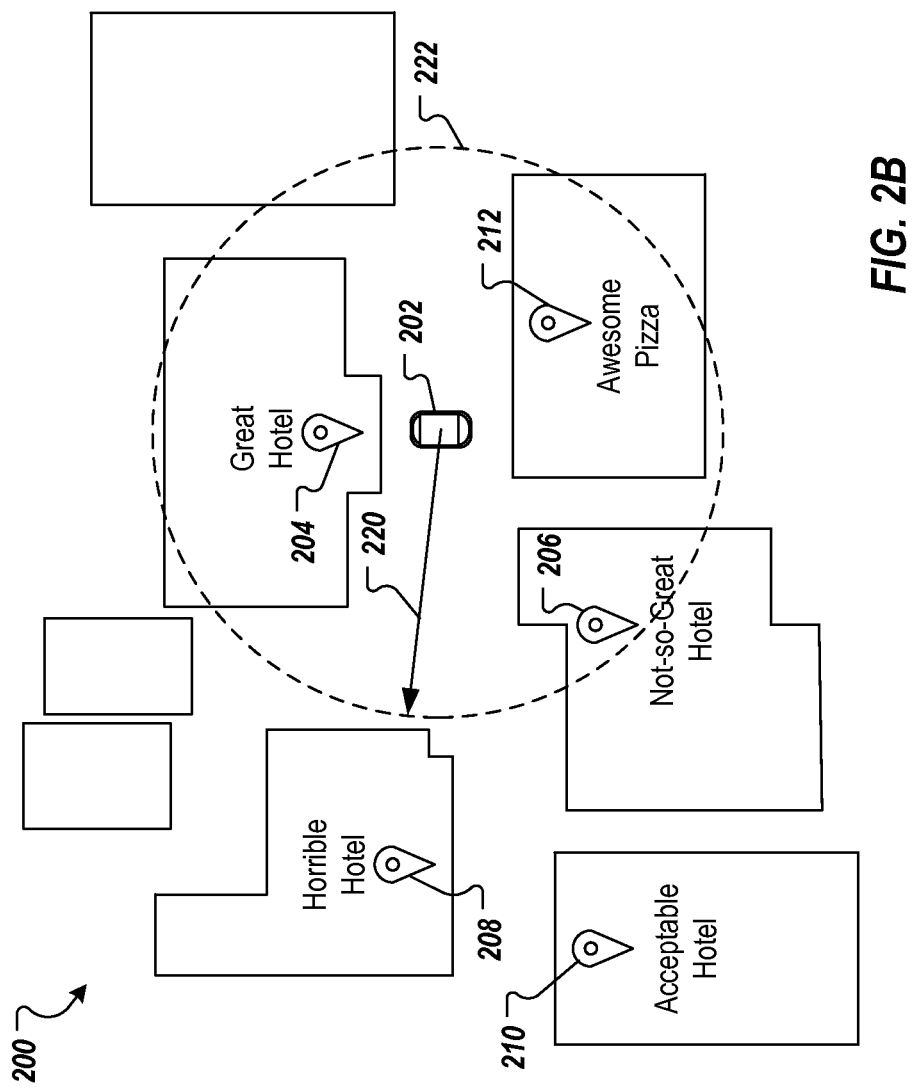

Implementations of the present disclosure will be described in further detail herein with reference to example use cases. FIGS. 2A and 2B depict example use cases in accordance with implementations of the present disclosure. In the examples of FIGS. 2A and 2B, an area 200 is provided, in which a user device 202 is located. Multiple entities are also located within the area 200. Example entities can include a restaurant, a bar, a hotel, a theater, a school, a university, a music venue, a tourist attraction, and a park. It is appreciated that implementations of the present disclosure are not limited to entities specifically identified herein. In the depicted example, an entity "Great Hotel" 204, an entity "Not-so-Great Hotel" 206, an entity "Horrible Hotel" 208, an entity "Acceptable Hotel" 210, and an entity "Awesome Pizza" 212 are provided in the area 200.

In accordance with implementations of the present disclosure, a query is received from a user device. For example, the user device 202 can provide a query to a search system, e.g., the search system 120 of FIG. 1. In some examples, it can be determined that the query is implicitly about an entity. In some examples, if the query is absent an explicit reference to an entity, it can be determined that the query is implicitly about an entity. In some examples, if the query includes a pronoun, it can be determined that the query is implicitly about an entity. In some implementations, the received query can be processed and can be compared to one or more query patterns to determine whether the query is implicitly referencing an entity. In some examples, the query is processed to remove one or more stop words and/or conversational terms to provide a cleaned query. For example, the example query [can you please show me ratings] can be processed to provide [ratings]. In some examples, the cleaned query is compared to one or more query patterns, each query pattern indicating an implicit reference to some entity. In some examples, if the cleaned query matches a query pattern, it is determined that the query is implicitly about some entity. In some examples, if the cleaned query does not match a query pattern, it is determined that the query is not implicitly about some entity. For example, the clean query [ratings], from the example above, can match a query pattern [ratings]. Consequently, it can be determined that the query [can you please show me ratings] is implicitly about some entity.

As another example, the example query [can you please show me ratings for Awesome Pizza] can be processed to provide the cleaned query [ratings Awesome Pizza]. The cleaned query [ratings Awesome Pizza] can be compared to one or more query patterns, and it can be determined that the cleaned query does not match any of the one or more query patterns. For example, the term "Awesome Pizza" is specific to an entity, and is thus, not included in any of the query patterns. Consequently, it is determined that the query [can you please show me ratings for Awesome Pizza] is not implicitly about some entity. Instead, and in this example, the query [can you please show me ratings for Awesome Pizza] is explicitly about an entity, i.e., Awesome Pizza.

In some implementations, in response to determining that the query is implicitly about an entity, an approximate location of the user device that submitted the query can be determined. In some examples, the approximate location can be determined based on one or more location-related signals. Example location related-signals can include cellular signals, global-positioning system (GPS) signals, wireless signals (WiFi), and the like. In some examples, location data that is representative of the one or more location-related signals is provided with the query. In some examples, the location data is provided to a location service, which processes the location data and provides the approximate location of the user device. In some examples, the approximate location can be provided as geographic coordinates, e.g., longitude, latitude.

In some examples, a confidence score can be associated with the approximate location. For example, the location service can provide the approximate location and the confidence score. In some examples, the confidence score represents a degree of certainty as to the accuracy of the approximate location. In some implementations, if the confidence score does not exceed a threshold confidence score, the query is not interpreted.

In some examples, a time can be associated with the approximate location. For example, the location service can provide the approximate location and a time associated therewith. In some examples, the time indicates an approximate time, at which the user device is determined to be or have been at the approximate location. In some implementations, if the approximate location is not determined to be sufficiently fresh, the query is not interpreted. In some examples, a time difference can be determined between a current time and the time associated with the approximate location and can be compared to a threshold difference. In some examples, if the time difference exceeds the threshold difference, the approximate location is determined to not be sufficiently fresh. In some examples, the current time is provided as the time, at which the query was sent from the user device, or received by the search system.

In some implementations, a set of entities is provided based on the approximate location. For example, if the confidence score exceeds the threshold confidence score and/or the approximate location is sufficiently fresh, the set of entities is provided, as described below. In some examples, the set of entities includes one or more entities. In some implementations, the set of entities includes one or more entities that are determined to be sufficiently close to the approximate location, such that the query could be potentially about the one or more entities.

In some implementations, the one or more entities are selected for inclusion in the set of entities based on a location of a respective entity relative to the approximate location. In some examples, entities that are within a threshold distance, e.g., threshold radius, of the location can be identified, and are included in the set of entities. For example, a geographic location can be divided into a grid that includes a plurality of cells, e.g., square or rectangular cells, each cell accounting for an area of the geographic location. In some examples, each cell is associated with a set of entities that are located in the respective area. In some examples, a cell, within which the approximate location lies can be identified, and can be provided as a central cell. In some examples, a plurality of surrounding cells that surround the central cell can be identified. For example, any cell that is at least partially within the threshold distance can be provided as a surrounding cell and can be included in the plurality of surrounding cells. In some examples, the set of entities includes all entities associated with the central cell and each of the surrounding cells in the plurality of surrounding cells.

In the examples of FIGS. 2A and 2B, a threshold radius 220 is provided, which defines a circular area 222. Although the example area 222 is circular, it is contemplated that the area can include any appropriate geometric shape. In some examples, entities that lie within the area 222 are included in the set of entities. Consequently, in the example of FIG. 2A, the entity "Great Hotel" 204 and the entity "Awesome Pizza" 212 are included in the set of entities, and in the example of FIG. 2B, the entity "Great Hotel" 204, the entity "Not-so-Great Hotel" 206 and the entity "Awesome Pizza" 212 are included in the set of entities. In some examples, the approximate location can be provided to an entity service, which processes the approximate location and provides the set of entities.

In some implementations, each entity is associated with a respective type. In some examples, the type corresponds to a category associated with the entity. For example, the entity "Great Hotel" 204 can be provided as a type [hotel]. As another example, the entity "Awesome Pizza" 212 can be provided as a type [restaurant]. In some examples, the entity service provides the respective type for each entity in the set of entities. In some examples, the type of an entity is determined from the knowledge graph, or database, which store information about respective entities, as described above.

In accordance with implementations of the present disclosure, for each entity in the set of entities, it is determined whether the query may be implicitly referencing the entity. In some examples, the type of the entity is cross-referenced to an index. In some examples, the index associates types to respective n-grams of queries. In some examples, an n-gram includes one or more terms of a query. If it is determined, based on the index, that one or more n-grams of the query correlate to the type, the query is deemed to be potentially about the respective entity, and the entity is added to a sub-set of entities.

In some implementations, the index is provided based on analysis of one or more search logs. In some examples, the search logs provide a record of received queries. In some examples, the search logs can be processed to provide the index. For example, the search logs can be processed to determine that queries including the term [menu] correlate to the type [restaurant]. As another example, the search logs can be processed to determine that queries including the term [reviews] correlate to the types [restaurant], [hotel], [movie], [play], [store] and [service provider]. In some examples, the index can be provided to correlate the term [menu] to the type [restaurant], and to correlate the terms [reviews] to the types [restaurant], [hotel], [movie], [play], [store], and [service provider].

In some implementations, a revised query is provided based on the query and at least one entity in the sub-set of entities. In some examples, the revised query is provided by rewriting the query to explicitly reference the at least one entity. In some examples, if the sub-set of entities includes one entity, the revised query is provided based on the entity.

In some implementations, if the sub-set of entities includes a plurality of entities, an entity is selected from the set of entities. In some examples, the entity is selected based on respective attributes of the entities. Example attributes can include review rating and popularity. For example, it can be determined whether all entities of the sub-set of entities include at least one attribute in common, e.g., each entity has a review rating associated therewith. In some examples, an attribute value for the common attribute can be provided for each entity of the sub-set of entities, and the entity having the highest attribute value is selected. For example, the entity having the highest review rating is selected. As another example, the entity having the highest popularity is selected. In some examples, the entity is selected based on one or more previously selected entities. For example, a type of a previously selected entity can be used to select an entity, when multiple types of entities are provided in a sub-set of entities. For example, the query [show me reviews] can be relevant to the types [restaurant] and [hotel], among others, and a sub-set of entities can include entities of the type [restaurant] and [hotel]. It can be determined that an entity previously selected by the user was of the type [hotel]. Consequently, an entity of the type [hotel] is selected from the sub-set of entities.

In some implementations, the revised query is provided to a search service. For example, the revised query can be processed by the search service 120 of FIG. 1. In some examples, the search service provides search results that are responsive to the revised query, which search results are displayed to the user. For example, the search results 112 of FIG. 1 can be provided based on the revised query.

Implementations of the present disclosure are described in further detail with reference to examples based on the example use cases of FIGS. 2A and 2B.

With reference to FIG. 2A, and in one example, the search query [show me room rates] is received from the user device 202. It is determined that the entity "Great Hotel" 204 having the type [hotel] and the entity "Awesome Pizza" 212 having the type [restaurant] are within the threshold distance of the approximate location of the user device 202. Consequently, the entities "Great Hotel" 204 and "Awesome Pizza" 212 are included in a set of entities. In this example, it is determined that one or more of the n-grams [room], [rate] and [room rate] correlate to the type [hotel]. Consequently, the entity "Great Hotel" 204 is included in a sub-set of entities. Also in this example, it is determined that none of the n-grams [room], [rate] and [room rate] correlate to the type [restaurant]. Consequently, the entity "Awesome Pizza" 212 is not included in the sub-set of entities. It can be determined that the entity "Great Hotel" 204 is the only entity in the sub-set of entities. In response, the query can be rewritten to explicitly reference "Great Hotel." For example, the query [show me room rates] can be rewritten to provide the revised query [room rates Great Hotel]. The revised query can be provided to a search service, and search results that are responsive to the revised query can be received.

With reference to FIG. 2B, and in another example, the search query [show me room rates] is received, and it is determined that the entity "Great Hotel" 204 having the type [hotel], the entity "Not-so-Great Hotel" 206 having the type [hotel], and the entity "Awesome Pizza" 212 having the type [restaurant] are within the threshold distance of the approximate location of the user device 202. Consequently, the entities "Great Hotel" 204, "Not-so-Great Hotel" 206 and "Awesome Pizza" 212 are included in a set of entities. In this example, it is determined that one or more of the n-grams [room], [rate] and [room rate] correlate to the type [hotel]. Consequently, the entities "Great Hotel" 204 and "Not-so-Great Hotel" 206 are included in a sub-set of entities. Also in this example, it is determined that none of the n-grams [room], [rate] and [room rate] correlate to the type [restaurant]. Consequently, the entity "Awesome Pizza" 212 is not included in the sub-set of entities. It can be determined that the sub-set of entities includes multiple entities, e.g., "Great Hotel" 204 and "Not-so-Great Hotel" 206. In response, one entity can be selected. In this example, it can be determined that the entities have at least one attribute in common. For example, each entity in the set of entities has a review rating associated therewith. Consequently, an entity can be selected based on the common attribute. In this example, the entity "Great Hotel" 204 has a better rating than the entity "Not-so-Great Hotel" 206. In response, the entity "Great Hotel" can be selected and the query can be rewritten to explicitly reference the entity "Great Hotel" instead of the entity "Not-so-Great Hotel." For example, the query [show me room rates] can be rewritten to provide the revised query [room rates Great Hotel]. The revised query can be provided to a search service, and search results that are responsive to the revised query can be received.

Referring again to FIG. 2B, and in another example, the search query [show me reviews] is received, and it is determined that the entity "Great Hotel" 204 having the type [hotel], the entity "Not-so-Great Hotel" 206 having the type [hotel], and the entity "Awesome Pizza" 212 having the type [restaurant] are within the threshold distance of the approximate location of the user device 202. Consequently, the entities "Great Hotel" 204, "Not-so-Great Hotel" 206 and "Awesome Pizza" 212 are included in a set of entities. In this example, it is determined that the n-gram [reviews] correlates to the types [restaurant], [hotel], [movie], [play], [store], and [service provider]. Consequently, the entities "Great Hotel" 204, "Not-so-Great Hotel" 206 and "Awesome Pizza" 212 are included in a sub-set of entities. It can be determined that the sub-set of entities includes multiple entities, e.g., "Great Hotel," "Not-so-Great Hotel" and "Awesome Pizza." In response, one entity can be selected.

In some examples, it can be determined that the entities have at least one attribute in common. For example, each entity in the sub-set of entities has a review rating associated therewith. Consequently, and in some examples, an entity can be selected based on the common attribute. In this example, the entity "Great Hotel" has a better rating than the entities "Not-so-Great Hotel" and "Awesome Pizza." Consequently, the entity "Great Hotel" can be selected.

In some examples, it can be determined that an entity previously selected by the user was of the type [hotel]. Consequently, an entity of the type [hotel] is to be selected from the sub-set of entities, which includes "Great Hotel" and "Not-so-Great Hotel" in this example. In this example, it can be determined that the entities have at least one attribute in common. For example, each of the entities "Great Hotel" and "Not-so-Great Hotel" has a review rating associated therewith. Consequently, and in some examples, an entity can be selected based on the common attribute. In this example, the entity "Great Hotel" has a better rating than the entity "Not-so-Great Hotel." Consequently, the entity "Great Hotel" can be selected.

In these examples, the query can be rewritten to explicitly reference the entity "Great Hotel" instead of the entities "Not-so-Great Hotel" or "Awesome Pizza." For example, the query [show me reviews] can be rewritten to provide the revised query [reviews Great Hotel]. The revised query can be provided to a search service, and search results that are responsive to the revised query can be received.

Figure 3:
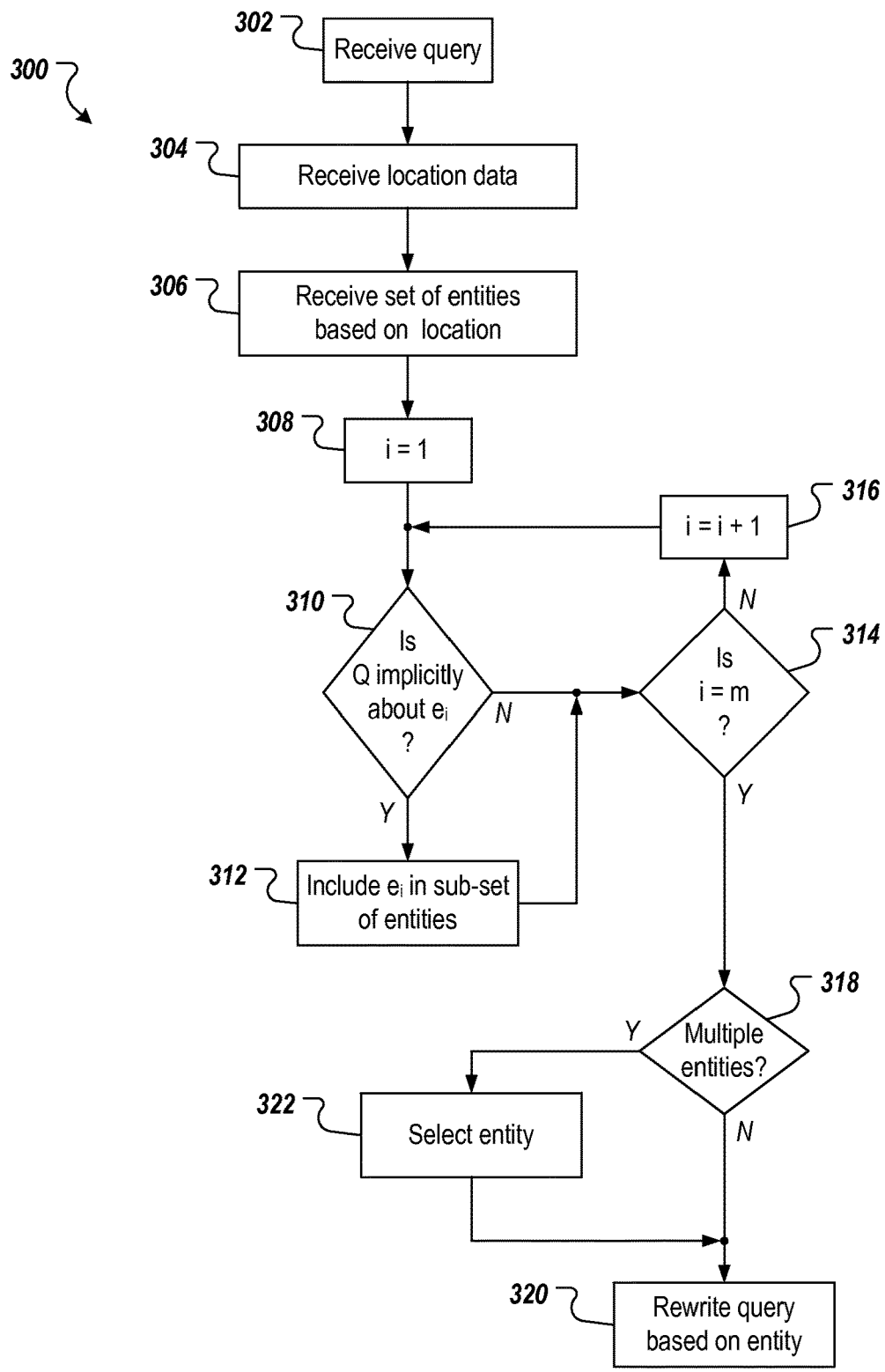
FIG. 3 depicts an example process that can be executed in accordance with implementations of the present disclosure.

FIG. 3 depicts an example process 300 that can be executed in accordance with implementations of the present disclosure. The example process 300 can be implemented, for example, by the example environment 100 of FIG. 1, e.g., the search system 120 and/or the query interpretation system 130. In some examples, the example process 300 can be provided by one or more computer-executable programs executed using one or more computing devices.

A query Q is received (302). For example, the search system 120 and/or the query interpretation system 130 receives a query from a user device 106, 202. Location data is received (304). For example, the search system 120 and/or the query interpretation system 130 receives location data from the user device 106, 202. In some examples, the location data can be provided with the query. A set of entities is received based on the location data (306). In some examples, entities e within a threshold distance of the user device 106, 202 are determined and are included in the set of entities. In some examples, the set of entities includes m entities, where m is greater than or equal to 1. A counter i is set equal to 1 (308).

It is determined whether the query Q is implicitly about an entity $e_i$ (310). In some examples, and as described herein, if one or more n-grams of the query Q are associated with a type of the entity $e_i$, the query Q is determined to be implicitly about the entity $e_i$. If the query Q is determined to be implicitly about the entity $e_i$, the entity $e_i$ is included in a sub-set of entities (312). If the query Q is not determined to be implicitly about the entity $e_i$, the entity $e_i$ is not included in a sub-set of entities, and it is determined whether the counter i is equal to m (314). If the counter i is not equal to m, all entities in the set of entities have not been considered. Consequently, the counter i is incremented (316), and the example process 300 loops back.

If the counter i is equal to m, all entities in the set of entities have been considered, and it is determined whether the sub-set of entities includes multiple entities (318). If the sub-set of entities does not include multiple entities, the query Q is rewritten based on the entity to provide the revised query (320). If the sub-set of entities includes multiple entities, an entity is selected (322), and the query Q is rewritten based on the entity to provide the revised query (320). In some examples, and as described herein, the entity is selected based on one or more respective attributes of the multiple entities, e.g., rating, popularity. As described herein, the revised query is used, e.g., by the search service 120, to provide search results responsive to the query Q.

Figure 4:
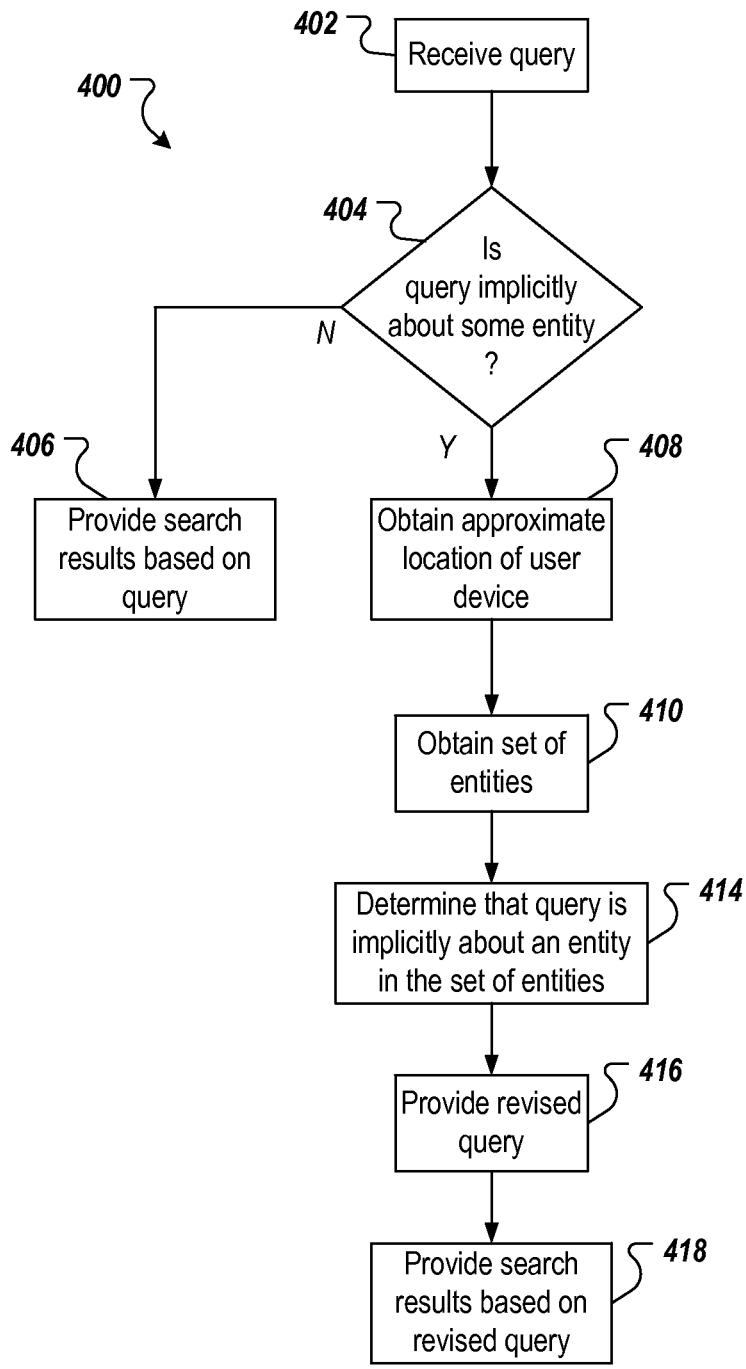
FIG. 4 depicts an example process that can be executed in accordance with implementations of the present disclosure.

FIG. 4 depicts an example process 400 that can be executed in accordance with implementations of the present disclosure. The example process 400 can be implemented, for example, by the example environment 100 of FIG. 1, e.g., the search system 120 and/or the query interpretation system 130. In some examples, the example process 400 can be provided by one or more computer-executable programs executed using one or more computing devices.

A query is received (402). For example, the search system 120 and/or the query interpretation system 130 receives a query from a user device 106, 202. It is determined whether the query is implicitly about some entity (404). For example, it can be determined that the query is absent an explicit reference to an entity. Consequently, it can be determined that the query is implicitly about some entity. As another example, it can be determined that the query includes a pronoun. Consequently, it can be determined that the query is implicitly about an entity. If it is determined that the query is not implicitly about some entity, search results are provided based on the query (406). For example, the search system 120 can receive search results that are responsive to the query, and can provide the search results to the user device 106, 202.

If it is determined that the query is implicitly about some entity, an approximate location of the user device is obtained (408). For example, the search system 120 and/or the query interpretation system 130 receives location data from the user device 106, 202. In some examples, the location data can be provided with the query. A set of entities is obtained (410). For example, the set of entities includes one or more entities that are each a threshold distance from the approximate location of the user device 106, 202. It is determined that the query is implicitly about an entity in the set of entities (414). For example, the entity is selected, because the set of entities includes only the entity. As another example, the entity is selected based on one or more respective attributes, e.g., rating, popularity, of multiple entities in the set of entities. A revised query is provided (416). For example, the query is rewritten to explicitly reference the entity. Search results are provided based on the revised query (418). For example, the search system 120 can receive search results that are responsive to the revised query, and can provide the search results to the user device 106, 202.

Implementations of the subject matter and the operations described in this specification can be realized in digital electronic circuitry, or in computer software, firmware, or hardware, including the structures disclosed in this specification and their structural equivalents, or in combinations of one or more of them. Implementations of the subject matter described in this specification can be realized using one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementation of the present disclosure or of what may be claimed, but rather as descriptions of features specific to example implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
receiving, by the one or more processors, a query provided from a user device, the query including one or more n-grams that each include one or more terms; and
determining, by the one or more processors, that the query is implicitly about some entity for which an explicit reference to is absent from the one or more terms of the query, and in response:
obtaining, by the one or more processors, an approximate location of the user device when the user device provided the query,
obtaining, by the one or more processors and based on the approximate location of the user device, a set of entities, wherein each entity in the set of entities is a named place with a particular name and at a particular location, and each entity in the set of entities is obtained based on the particular location of the entity being within a threshold distance of the approximate location, and determining, by the one or more processors, that the query is implicitly about an entity in the set of entities, and in response:

providing, by the one or more processors, a revised query based on the query and the particular name of the entity, the revised query explicitly referencing the entity by the particular name of the entity;

wherein:

determining that the query is implicitly about the entity in the set of entities that was obtained based on the approximate location of the user device comprises, for each entity in the set of entities:

accessing an index that associates entities with entity types and associates entity types with n-grams, wherein each entity type specifies a particular category to which a plurality of particular entities belong, and for each entity type, the index specifies n-grams that are determined be correlated to the entity type, and wherein each of the n-grams determined be correlated to the entity type are not n-grams that explicitly reference the particular entities that belong to the category specified by the entity type;

determining an entity type of the entity based on the index; and determining whether the n-grams of the query correlate to the entity type of the entity based on the n-grams of the query matching n-grams that are determined be correlated to the entity type as specified in the index;

for each entity associated with the entity type to which the n-grams of the query correlate, including the entity in the sub-set of entities; and selecting the entity from the subset of entities, wherein the subset of entities includes at least two or more entities, the selecting comprising:

determining that each of the entities in the subset of entities have a common attribute, wherein the common attribute for each entity relates to a popularity of the entity; and selecting the entity with a highest popularity among the entities based on the common attribute.

2. The method of claim 1, wherein the one or more types associated with the query are provided from an index that associates types to respective n-grams of queries.

3. The method of claim 1, wherein receiving a set of entities and determining that the query is implicitly about an entity in the set of entities are performed in response to determining that the approximate location is sufficiently fresh.

4. A system comprising:

a non-transitory data store for storing data; and one or more processors configured to interact with the data store, the one or more processors being further configured to perform operations comprising:

receiving, by the one or more processors, a query provided from a user device, the query including one or more n-grams that each include one or more terms; and determining, by the one or more processors, that the query is implicitly about some entity for which an explicit reference to is absent from the one or more terms of the query, and in response:

obtaining, by the one or more processors, an approximate location of the user device when the user device provided the query, obtaining, by the one or more processors and based on the approximate location of the user device, a set of entities, wherein each entity in the set of entities is a named place with a particular name and at a particular location, and each entity in the set of entities is obtained based on the particular location of the entity being within a threshold distance of the approximate location, and determining, by the one or more processors, that the query is implicitly about an entity in the set of entities, and in response:

providing, by the one or more processors, a revised query based on the query and the particular name of the entity, the revised query explicitly referencing the entity by the particular name of the entity;

wherein:

determining that the query is implicitly about the entity in the set of entities that was obtained based on the approximate location of the user device comprises, for each entity in the set of entities:

accessing an index that associates entities with entity types and associates entity types with n-grams, wherein each entity type specifies a particular category to which a plurality of particular entities belong, and for each entity type, the index specifies n-grams that are determined be correlated to the entity type, and wherein each of the n-grams determined be correlated to the entity type are not n-grams that explicitly reference the particular entities that belong to the category specified by the entity type;

determining an entity type of the entity based on the index; and determining whether the n-grams of the query correlate to the entity type of the entity based on the n-grams of the query matching n-grams that are determined be correlated to the entity type as specified in the index;

for each entity associated with the entity type to which the n-grams of the query correlate, including the entity in the sub-set of entities; and selecting the entity from the subset of entities, wherein the subset of entities includes at least two or more entities, the selecting comprising:

determining that each of the entities in the subset of entities have a common attribute, wherein the common attribute for each entity relates to a popularity of the entity; and selecting the entity with a highest popularity among the entities based on the common attribute.

5. The system of claim 4, wherein receiving a set of entities and determining that the query is implicitly about an entity in the set of entities are performed in response to determining that the approximate location is sufficiently fresh.

6. A non-transitory computer readable medium storing instructions that, when executed by one or more processors, cause the one or more processors to perform operations comprising:

receiving, by the one or more processors, a query provided from a user device, the query including one or more n-grams that each include one or terms; and determining, by the one or more processors, that the query is implicitly about some entity for which an explicit reference to is absent from the one or more terms of the query, and in response:
  obtaining, by the one or more processors, an approximate location of the user device when the user device provided the query,
  obtaining, by the one or more processors and based on the approximate location of the user device, a set of entities, wherein each entity in the set of entities is a named place with a particular name and at a particular location, and each entity in the set of entities is obtained based on the particular location of the entity being within a threshold distance of the approximate location, and
  determining, by the one or more processors, that the query is implicitly about an entity in the set of entities, and in response:
    providing, by the one or more processors, a revised query based on the query and the particular name of the entity, the revised query explicitly referencing the entity by the particular name of the entity;
wherein:
  determining that the query is implicitly about the entity in the set of entities that was obtained based on the approximate location of the user device comprises, for each entity in the set of entities:
    accessing an index that associates entities with entity types and associates entity types with n-grams, wherein each entity type specifies a particular category to which a plurality of particular entities belong, and for each entity type, the index specifies n-grams that are determined be correlated to the entity type, and wherein each of the n-grams determined be correlated to the entity type are not n-grams that explicitly reference the particular entities that belong to the category specified by the entity type;
    determining an entity type of the entity based on the index; and
    determining whether the n-grams of the query correlate to the entity type of the entity based on the n-grams of the query matching n-grams that are determined be correlated to the entity type as specified in the index;
  for each entity associated with the entity type to which the n-grams of the query correlate, including the entity in the sub-set of entities; and
  selecting the entity from the subset of entities, wherein the subset of entities includes at least two or more entities, the selecting comprising:
    determining that each of the entities in the subset of entities have a common attribute, wherein the common attribute for each entity relates to a popularity of the entity; and
    selecting the entity with a highest popularity among the entities based on the common attribute.

7. The non-transitory computer readable medium of claim 6, wherein receiving a set of entities and determining that the query is implicitly about an entity in the set of entities are performed in response to determining that the approximate location is sufficiently fresh.

* * * * *

UNITED STATES PATENT AND TRADEMARK OFFICE
CERTIFICATE OF CORRECTION

| | | |
|---|---|---|
| PATENT NO. | : 10,474,671 B2 | Page 1 of 1 |
| APPLICATION NO. | : 14/707669 | |
| DATED | : November 12, 2019 | |
| INVENTOR(S) | : Behzadi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 642 days.

Signed and Sealed this
Twenty-first Day of July, 2020

Andrei Iancu
*Director of the United States Patent and Trademark Office*